Sept. 19, 1967 P. CHAROS 3,342,182
PACKAGED CREAM APPLICATOR
Filed June 29, 1964

INVENTOR.
PETER CHAROS
BY Henry L. E. Metzler
ATTORNEY

3,342,182
PACKAGED CREAM APPLICATOR
Peter Charos, Maylen Drive, Hampton Bays,
N.Y. 11946
Filed June 29, 1964, Ser. No. 378,704
2 Claims. (Cl. 128—260)

The present invention relates to improvements in cosmetic applicators and, more specifically, to a new and improved hand-cream applicator which is an improvement over my co-pending patent application for heated cream applicator gloves.

One object of the present invention is the provision of a device of the character described which simplifies the application of a medical or cosmetic cream or the like to a person's hands by making the application more sterile, faster and neater, and by aiding in absorbing the cream or preparation into the skin.

Another object of the present invention is the provision of a device of the character described which makes available to the user a sealed device, containing the proper quantity of cream or the like for each application, so as to attain economy, to reduce waste and to eliminate hazards of side effects of using an excessive amount of cream.

A further object of the present invention is the provision of a device of the character described which is particularly well adapted for the application of water-dispensable preparations, which can be used not only for a limited or a short application but also for continuous application, and which is a highly attractive sales medium for cosmetic creams or the like.

With the foregoing and other objects which will appear as the description proceeds, the invention consists of certain novel details of construction and combinations of parts hereinafter more fully described and pointed out in the claims, it being understood that changes may be made in the construction and arrangements of parts of the embodiment disclosed without departing from the spirit of the invention as claimed.

In the accompanying drawing I have set forth an illustrative embodiment of my invention.

In said drawing.

Similar reference characters refer to similar parts throughout the seevral views.

Figure 1:
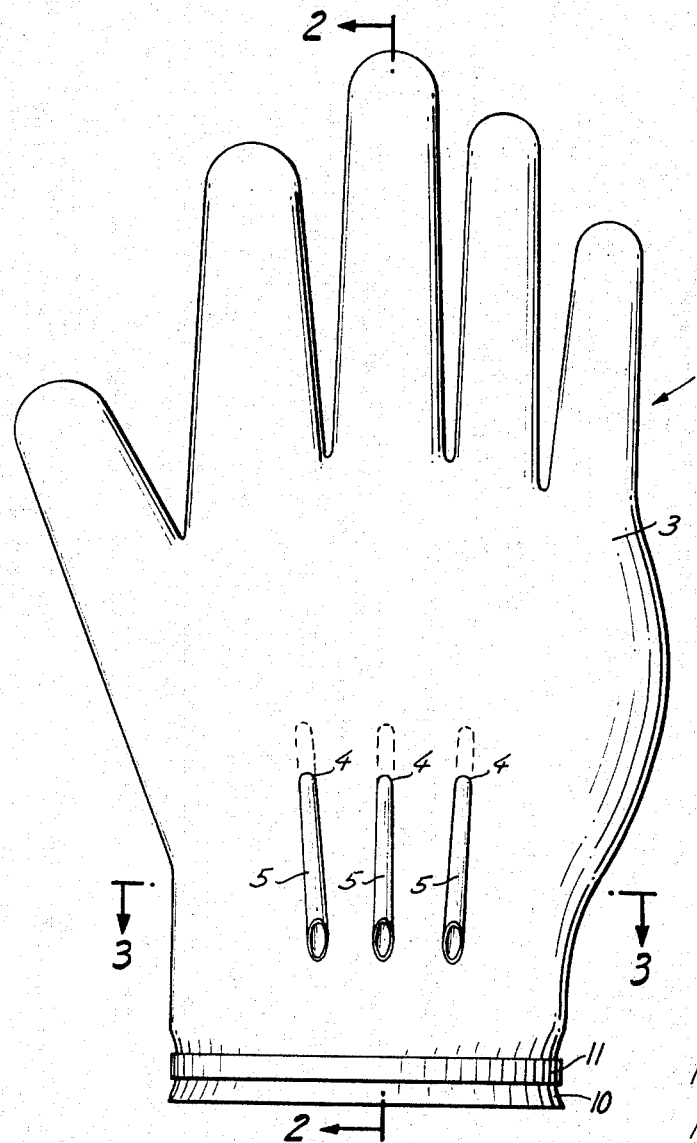
FIGURE 1 is a back-plan view of a preferred embodiment of my invention.

In the drawing the numeral 1 denotes a glove which has a soft, absorbent inner side 2 and a substantially impermeable outer side 3. The inner side 2 may be a porous lining, and the outer side 3 may be of thin plastic material or the like, or the glove 1 may be made of a plastic or paper-like material that has an inner absorbent or sponge-like inside and a smooth outer side.

The inner side or the lining 2 is impregnated with a medical preparation, such as a cosmetic cream or the like which has the characteristic that it is water dispensable. This medical preparation, or cosmetic cream, or hand lotion, or the like is no part of my invention. My invention is limited only to the applicator, which can be used in connection with any cream or the like and for various purposes. While I have shown in the drawing a glove as an embodiment of my invention, and while the invention is primarily intended for applying cream or the like to a person's hands, it will be obvious that the principle of my invention also could be used for treating other parts of the human body; for instance, instead of a glove, my new and improved applicator could be shaped as a sock or a stocking for treatment of a person's feet or legs.

The device is sold to the consumer ready for use, which means its inner side or lining 2 is properly impregnated with the preparation. Thus if the device is shaped as a glove, the user has only to insert his or her dampened or moistened hands into the applicator glove 1, and the user does not have to spend time and effort for rubbing or for massaging the cream into the skin, but simply by wearing the impregnated gloves and by manipulating the hands and the figures during any ordinary activities, the preparation is mixed with the water or the moisture on the skin and is dispensed evenly on the skin. The glove 1 preferably is so dimensioned that it fits fairly tight—the outer layer 3 may be of rubber or of any other suitable elastic material—so that pressure is brought to bear on the skin, which aids the skin in absorbing the preparation.

Figure 2:
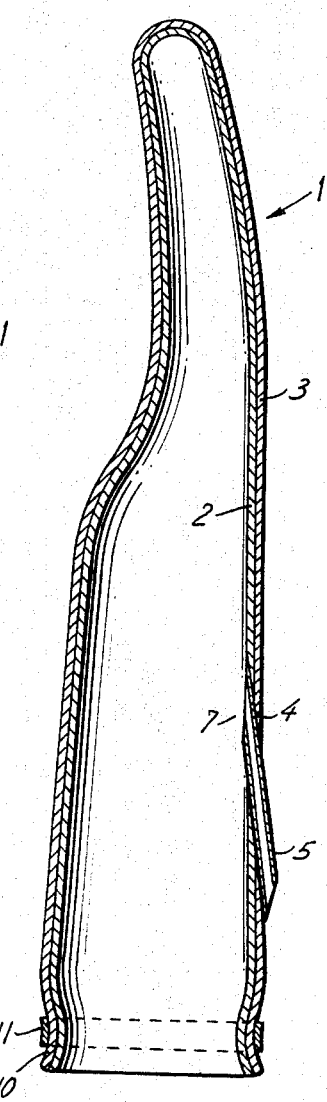
FIG. 2 is a sectional view on the line 2—2 of FIG. 1.
Figure 3:
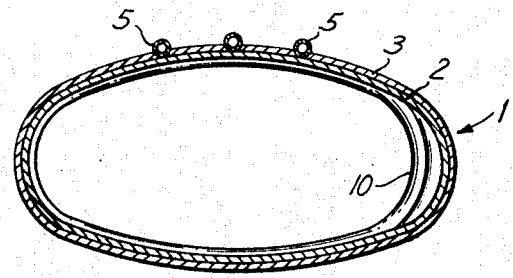
FIG. 3 is a sectional view on the line 3—3 of FIG. 1.

Frequently one single application of the cream to the skin is sufficient for each treatment. However, if it is necessary to have a continuous or repeated application, for instance, if it is desired to apply the preparation every hour without removing the applicator, I prefer to provide at least the outer layer 3 with slots 4 preferably at or near the wrist section, and to extend therethrough preferably flattened rib sealed tubes 5 that are open at 7 (FIG. 2) and filled with the cream or preparation. The tubes or cartridges 5 may be constructed as small, thin, longitudinal collapsible tubes, so that by squeezing them the preparation is dispensed into the applicator, either directly upon the person's skin, if the tubes 5 penetrate the inner layer 2, or upon the inner layer 2 which then becomes saturated and evenly distributes the cream on the skin.

I also prefer to provide the glove 1 with a reduced resilient section 10 at its lower end portion, with or without an elastic band 11, so that the hand can be sealed in the glove tightly. This airtight clinching of the glove around the person's wrist enhances the absorption of the cream by the skin.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A device of the character described comprising a glove fitting tightly around a person's wrist and having inner and outer panel portions, and a plurality of cartridges extending through slots in one of said outer panel portions and being open toward the inner one of the panel portions and the interior of the glove, said cartridges being adapted for holding a cosmetic, and to dispense the same into the glove, said inner one of the panel portions being porous and lining said glove, said outer one of said outer portions being of a resilient material and bringing pressure to bear on the hand to which the glove is applied to massage the cosmetic preparation into the skin of the hand.

2. A covering, said covering comprising
an inner lining impregnated with a cream preparation,
an outer resilient layer,
said outer resilient layer being of an elastic material covering dimensioned so that it tightly fits the portion of the body to which it is applied thereby bringing pressure to bear on such portion of the body to rub the same upon relative movement of such portion of the body with respect to said covering to massage the cream preparation into the skin said outer lining having at least a tube therein opening into the interior of the covering, said tube being collapsible and containing a cream preparation which is adapted to be dispensed therefrom into the interior of the covering through an opening therein when the tube is collapsed.

References Cited

UNITED STATES PATENTS

| | | | |
|---|---|---|---|
| 246,454 | 8/1881 | Bruen | 66—187 |
| 2,501,565 | 3/1950 | Halley | 128—268 |
| 3,116,732 | 1/1964 | Cahill | 128—260 |

ADELE M. EAGER, *Primary Examiner.*